United States Patent [19]

Atkins et al.

[11] Patent Number: 4,602,519
[45] Date of Patent: Jul. 29, 1986

[54] TWO SPEED LIGHTWEIGHT RACING TRANSMISSION

[76] Inventors: John Atkins, 711 Dunston, Colorado Springs, Colo. 80907; Michael A. Bonicelli, 1470 Friendship Lane St., Colorado Springs, Colo. 80904; Charles E. Conser, 3110 Cortina Dr., Colorado Springs, Colo. 80918

[21] Appl. No.: 663,282

[22] Filed: Feb. 25, 1985

[51] Int. Cl.[4] .................. F16H 3/08; F16H 57/02; B21K 21/16; B23P 21/00
[52] U.S. Cl. .................. 74/375; 74/606 R; 29/401.1; 29/469
[58] Field of Search .............. 74/363, 369, 370, 371, 74/372, 359, 606 R, , 745, 375; 29/401.1, 469

[56] References Cited

U.S. PATENT DOCUMENTS

| 731,502 | 6/1903 | Rondet | 74/371 |
|---|---|---|---|
| 1,035,040 | 8/1912 | Paulson | 74/371 |
| 2,178,712 | 11/1939 | Whitney | 74/370 |
| 2,644,439 | 7/1953 | Behringer | 74/370 |
| 2,811,049 | 10/1957 | Dennis | 74/370 |
| 3,088,336 | 5/1963 | Fodrea | 74/745 |
| 3,186,081 | 6/1965 | Barisch | 29/469 |
| 4,019,400 | 4/1977 | Stump | 74/363 X |
| 4,311,067 | 1/1982 | Froumajou | 74/371 X |
| 4,343,612 | 8/1982 | Blanchard | 74/372 X |

FOREIGN PATENT DOCUMENTS

| 532830 | 8/1931 | Fed. Rep. of Germany | 74/370 |
| 169361 | 11/1951 | Fed. Rep. of Germany | 74/359 |

Primary Examiner—Allan D. Herrmann
Assistant Examiner—Stephen B. Andrews
Attorney, Agent, or Firm—Henderson & Sturm

[57] ABSTRACT

This invention relates generally to the field of automobile transmissions, and is specifically directed to the method of modifying a standard multi-speed transmission to obtain a lightweight two speed racing transmission, having an improved power to weight ratio, and a simplified shifting pattern, which are particularly desirable for modified, sprint, and stock cars racing on oval tracks.

3 Claims, 2 Drawing Figures

TWO SPEED LIGHTWEIGHT RACING TRANSMISSION

BACKGROUND OF THE INVENTION

One of the cardinal rules governing the design of racing cars is that every conceivable means to lighten the chassis, engine, transmission, etc., is employed as long as it does not impair the performance of the car. The reason for this, is that given the same power plant, the lighter of two otherwise identical cars will obtain a higher speed for a given horsepower.

Two of the biggest problems faced today in automobile racing are the desire for an optimum power to weight ratio, and the need for reliability in the parts being used. An example of one proposed solution to the problem would be the single speed transmission now being used by the United States Auto Club Sprint Car Division. These transmissions while lighter than a full four or five speed racing transmission, are not only expensive, but must be specially constructed for the racing car being used. They also offer only one speed, thus allowing the driver only the choice of in gear or out of gear operation. While this may be fine during full racing speeds; it also causes such problems as spark plug fouling during slow traffic or caution periods during a race.

Another example would be the 4, 5 or 6 speed racing transmission commonly used in all other types of racing cars today. While these overcome the previous disadvantages of the one speed transmission; they are also disadvantageous because of the increase in power to weight ratios, and the increased likelihood of mechanical failure due to the additional moving parts required for the unused gears.

The intended purpose of this invention is to provide a two speed racing transmission which is lightweight to provide an improved power to weight ratio; which is easily adapted to the majority of oval track racing cars; and further allows the racing driver a choice of full speed gearing, or gearing for lower speeds, so that the RPM'S of the engine can be kept at an increased level to maintain optimum performance. Also, with fewer moving parts, and a simplified shifting linkage resulting from the proposed construction, reliability will be greatly improved.

Since the 1 speed transmission is very expensive to manufacture, and the multi-speed transmission add weight and torque to the transmission through the lower speed ratio gear clusters and linkages which are only employed a fraction of the time, a compromise has been sought.

While it might seem a simple concept to arrive at a solution to the aforementioned problem by developing a two-speed transmission which only employs the higher speeds, it is neither simple nor obvious to arrive at the method and apparatus which forms the basis of this invention.

On its face the most logical solution to the problem, would be to design and construct a totally new two speed transmission. However, this solution would prove to be even more expensive than the single speed transmissions mentioned supra.

On the other hand, the solution provided by this invention is unique; in that it takes an existing multi-speed transmission, and converts it into a lightweight two speed transmission, by virtue of a simple modification process, which employs very few, and inexpensive, additional parts. The resultant transmission is extremely reliable, lightweight, easier to shift, and has a vastly improved power to weight ratio and performance characteristic over any existing transmission.

SUMMARY OF THE INVENTION

An object of the present invention is the provision of a light-weight racing transmission having simplified mechanical gearing which is particularly well suited for oval track racing conditions.

A further object of the present invention is the provision of a racing transmission which has only two speeds, either of which powers the car when the clutch is let out, and to provide a straight line speed shift lever path.

Another object of the present invention is the provision of a racing transmission which dispenses with the extraneous gearing and linkage which are neither required, nor desired in oval track racing cars.

Still another object of the present invention is the provision of a two speed racing transmission, which virtually eliminates the mis-shift engine damage problems encountered by race car drivers, in pressure situations, with other multiple speed transmissions.

A still further object of the present invention is to not only increase the power to weight ratio for the car in which the invention is installed; but also to eliminate the added torque on the transmission, inposed by the unengaged linkages, and gears, in common multi-speed transmissions.

Yet another object of the present invention is the provision of a racing transmission, having a single high ratio gear for racing situations, and a single lower ratio gear for "slowdown" or "caution" situations.

A yet still further object of the present invention is the provision of a racing transmission; which is not only particularly well suited for oval race track cars, in that it employs a straight line shift mechanism; but also reduces the horsepower requirements for a given speed, due to the weight savings realized by installing this transmission in that type of race car.

The most important object of this invention; however, is to provide a method for constructing a two speed racing transmission, from a standard multi-speed racing transmission, and a few additional elements.

These and other objects, advantages and novel features of the invention will become apparent from the detailed description which follows, when considered in conjunction with the accompanying drawings.

A yet still further object of the present invention is the provision of a racing transmission; which is not only particularly well suited for oval race track cars, in that it employs a straight line shift mechanism; but also reduces the horsepower requirements for a given speed, due to the weight savings realized by installing this transmission in that type of race car.

DETAILED DESCRIPTION OF THE PREFERRED EMBODIMENT

Figure 1:
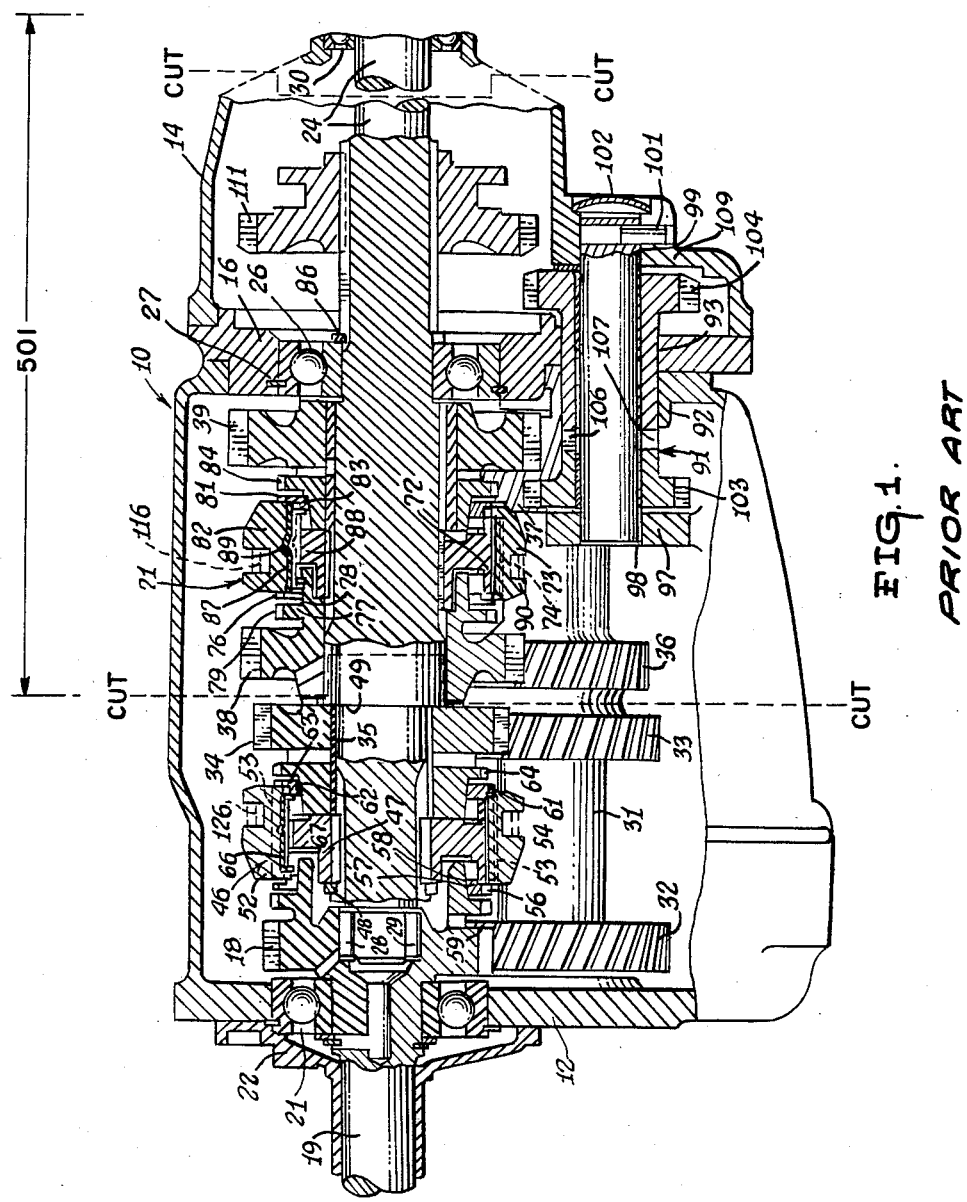
FIG. 1 is a cross-sectional view of a respective four speed transmission.

As representative four speed transmission is illustrated in FIG. 1. This particular drawing is identical to one that appears in U.S. Pat. No. 3,088,336, and is used for illustration purposes only. It is not intended to form part of this invention; but merely to demonstrate, how the present invention can be used to modify any existing multi-speed transmission, to create a two-speed transmission, particularly adapted to oval track racing cars.

For a better understanding of the operation of the mechanism illustrated in FIG. 1, the written specification of U.S. Pat. No. 3,088,336 is herein incorporated by reference.

Figure 2:
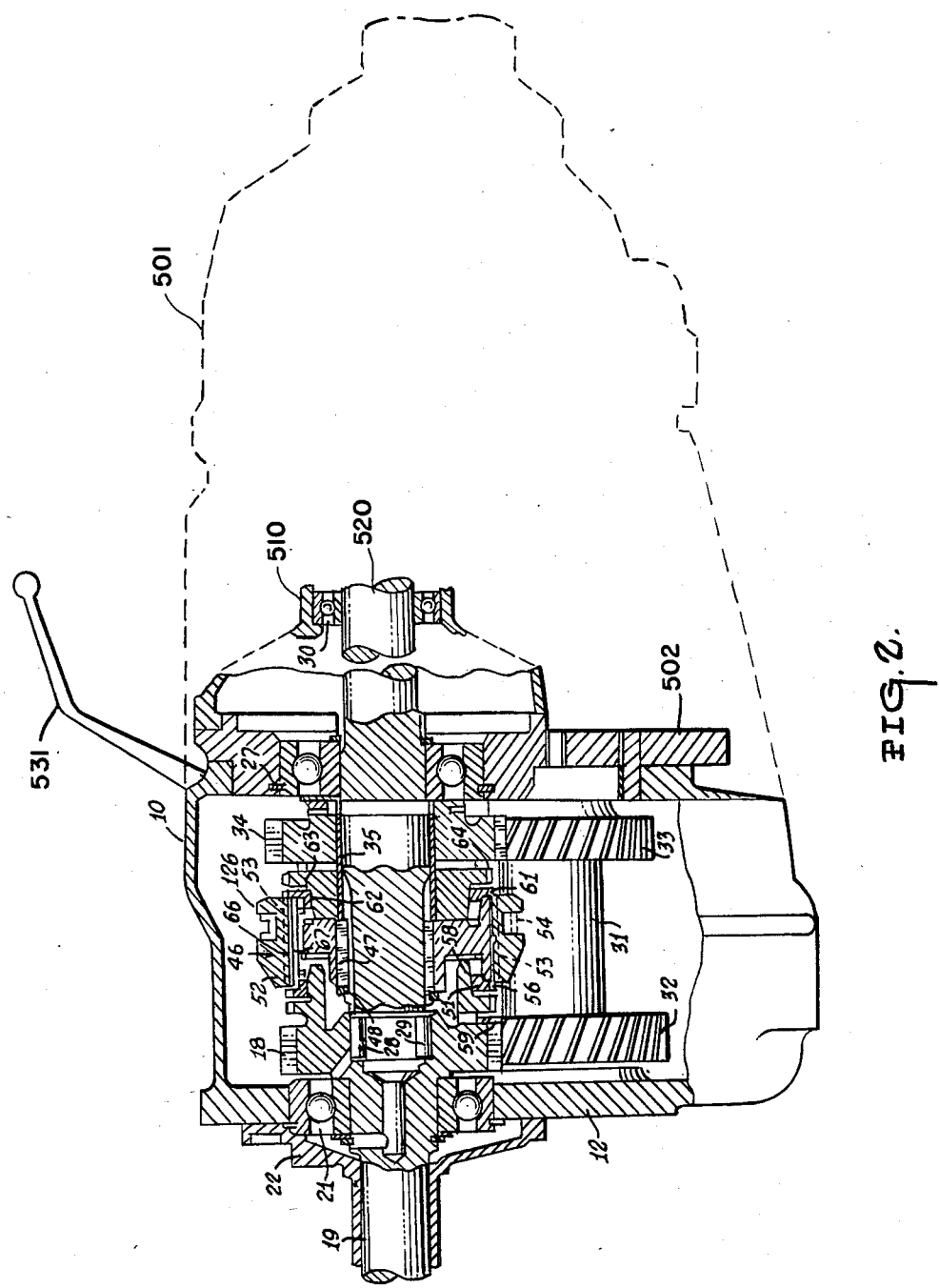
FIG. 2 is a cross-sectional view of a two speed transmission constructed in accordance with the present invention, clearly illustrating the savings in size and complexity accomplished thereby.

By comparing the transmissions illustrated in FIGS. 1 and 2, it should be readily apparent that the transmission of FIG. 2; has eliminated all of the sliding gears, which selectively engage the individual lower ratio gears; and further employs a housing and transmission shaft which are approximately one-half the length of their respective components in FIG. 1. It should also be appreciated, that the number of control linkages that the shaft lever actuates, has been reduced by the number of lower gears that have been eliminated from the housing.

The improved twin speed transmission, which forms the present invention, can be fabricated from any existing multi-speed transmission.

For example a two speed transmission was constructed in accordance with the teachings of the invention in the following manner: The rear half and tail housing 501 of a General Motors "Saginaw" four-speed transmission was cut off, thereby eliminating or removing the 1st and 2nd speed and reverse gear clusters, along with the reverse counter shaft and gear. The tail housing was replaced by a flat plate 502 having an output shaft housing 510, and the main shaft 520 was shortened.

The actual cutting or chopping of the transmission can be accomplished in numerous well recognized ways, and it is even contemplated that a low cost laser can be developed that could quickly and inexpensively perform the cutting operation. In any event, regardless of the method employed, it should be understood that the cuts should be clean, smooth and perpendicular to the axis of the transmission for obvious reasons.

To install the shifting mechanism to the modified transmission, it is a simple matter to pivotally connect the shift lever 531 directly to the third-fourth change over sleeve 52 which controls the shift fork, (not shown) so that either the higher or lower gear ratio will be engaged at any given time.

While this invention on its face appears to be very simple, a transmission constructed in accordance with the teachings contained herein, produces a device having features and operating characteristics, which are particularly well suited to a racing environment, and extremely desirable for modified, sprint and stock cars, racing on oval tracks, where weight savings are beneficial, and fewer gear speeds are required.

Having thereby disclosed the subject matter of this invention, it should be obvious that many substitutions, modifications and variations are possible in light of the above disclosure. It is therefore to be understood that the invention as described is only to be limited to the extent of the breadth and scope of the appended claims.

We claim:

1. A method for constructing an improved two speed racing transmission from an existing multi-speed transmission having a transmission housing, a transmission output shaft and at least three transmission gear ratios associated with the output shaft; wherein the method comprises the steps of:
(a) severing the existing multi-speed transmission housing and output shaft, at a point where only the two highest gear ratios will remain on the transmission output shaft;
(b) severing a portion of the severed output shaft, and securing that portion to the transmission output shaft retaining the two highest gear ratios; and
(c) placing a plate having an output shaft housing over the free end of the said output shaft portion, and securing the plate to the open end of the transmission housing;
(d) connecting a shifting mechanism through the transmission housing, and operatively attaching the shifting mechanism to the said two highest gear ratios.

2. A method as in claim 1 wherein; the shifting mechanism comprises, a shifting lever pivotally connected to the transmission housing to actuate a shift fork, wherein the shift lever controls the engagement of the two remaining gear ratios in a push-pull manner.

3. An improved two speed racing transmission built in accordance with the method of claim 2.

* * * * *